(12) United States Patent
Lanz

(10) Patent No.: US 9,409,618 B2
(45) Date of Patent: Aug. 9, 2016

(54) GUIDE DEVICE FOR A FLEXIBLE LINKING MEMBER PASSING INTO A BICYCLE FRAME

(71) Applicant: Matthieu Lanz, Nevers (FR)

(72) Inventor: Matthieu Lanz, Nevers (FR)

(73) Assignee: Look Cycle International

( * ) Notice: Subject to any disclaimer, the term of this patent is extended or adjusted under 35 U.S.C. 154(b) by 0 days.

(21) Appl. No.: 14/561,310

(22) Filed: Dec. 5, 2014

(65) Prior Publication Data

US 2015/0298759 A1    Oct. 22, 2015

(30) Foreign Application Priority Data

Apr. 18, 2014   (FR) ...................... 14 53529

(51) Int. Cl.
*B62K 19/32* (2006.01)
*B62K 21/06* (2006.01)
*B62K 21/12* (2006.01)
*B62J 99/00* (2009.01)

(52) U.S. Cl.
CPC ................. *B62K 19/32* (2013.01); *B62K 21/06* (2013.01); *B62K 21/12* (2013.01); *B62J 2099/0046* (2013.01)

(58) Field of Classification Search
CPC ................................ B62K 19/32; B62K 21/12
See application file for complete search history.

(56) References Cited

U.S. PATENT DOCUMENTS

| | | | |
|---|---|---|---|
| 4,466,629 A * | 8/1984 | Sinyard | B62K 21/06 280/279 |
| 5,301,974 A * | 4/1994 | Knapp | B62J 1/06 188/322.17 |
| 6,126,323 A * | 10/2000 | Tange | B62K 21/06 280/279 |
| 8,109,530 B2 * | 2/2012 | Lanz | B62K 19/32 280/279 |
| 2005/0057017 A1 * | 3/2005 | Hara | B62K 21/12 280/279 |
| 2005/0093269 A1 * | 5/2005 | Horiuchi | B62K 19/32 280/279 |
| 2005/0098979 A1 * | 5/2005 | Horiuchi | B62K 19/32 280/279 |
| 2005/0115777 A1 * | 6/2005 | Goring | B62M 25/02 188/24.11 |
| 2006/0157955 A1 * | 7/2006 | Kurokawa | B62K 11/04 280/279 |
| 2008/0100026 A1 * | 5/2008 | Bouchez | B62K 19/32 280/279 |
| 2009/0218785 A1 * | 9/2009 | Tsai | B62K 19/32 280/279 |
| 2011/0121538 A1 * | 5/2011 | Giroux | B62K 19/32 280/280 |
| 2011/0148070 A1 * | 6/2011 | Lanz | B62K 21/06 280/279 |
| 2013/0009379 A1 * | 1/2013 | Matthews | B62K 19/32 280/279 |

(Continued)

FOREIGN PATENT DOCUMENTS

CN    201604757 U    10/2010
DE    202013005555 U1    8/2013

OTHER PUBLICATIONS

French Search Report, dated Aug. 18, 2014, from corresponding French application.

*Primary Examiner* — Kevin Hurley
*Assistant Examiner* — Gabriela C Craciun
(74) *Attorney, Agent, or Firm* — Sofer & Haroun, LLP

(57) ABSTRACT

The device is designed to guide a flexible linking member passing into a bicycle frame to link a control member carried by bicycle handlebars to a receiver. The linking member (14) enters the bicycle frame via an inlet opening (15) formed in a head tube (1). The guide device (3) forms an insert that can be built into the head tube (1) and includes a guide channel (17) for the linking member (14) intended to communicate with the inlet opening (15). The insert (3) can be placed inside the head tube (1) in a seat (4) shared with an upper bearing (2) of a headset and has an internal face that can at least partially surround a fork steerer (6) inserted in the head tube (1), and an external face containing the guide channel (17).

14 Claims, 3 Drawing Sheets

(56) References Cited

U.S. PATENT DOCUMENTS

| | | | | |
|---|---|---|---|---|
| 2013/0076000 A1* | 3/2013 | Man | ................... | B62K 21/18 280/279 |
| 2013/0175782 A1* | 7/2013 | Matthews | ............. | B62K 19/32 280/279 |
| 2014/0375017 A1* | 12/2014 | Poss | ................ | B62K 29/32 280/281.1 |
| 2015/0128753 A1* | 5/2015 | Goring | ................ | B62L 3/02 74/502.6 |
| 2015/0158433 A1* | 6/2015 | Watanabe | ............. | B62J 11/00 280/270 |
| 2015/0259022 A1* | 9/2015 | Nago | ................ | B62K 21/18 74/551.1 |
| 2015/0259023 A1* | 9/2015 | Nago | ................ | B62K 21/12 280/279 |

* cited by examiner

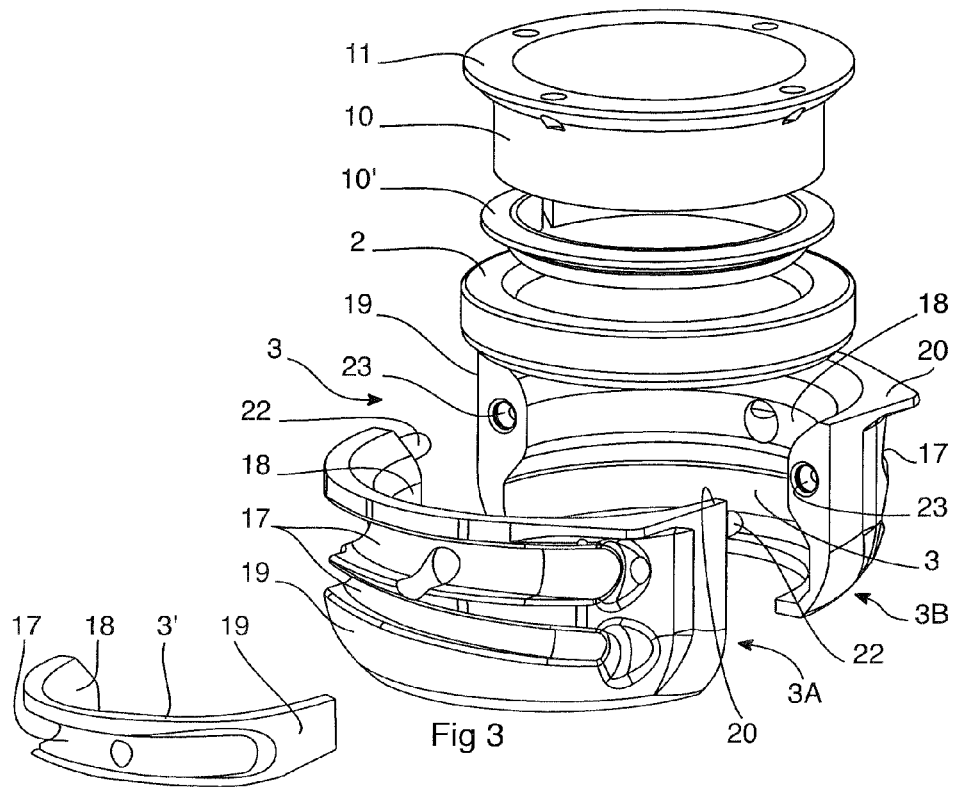
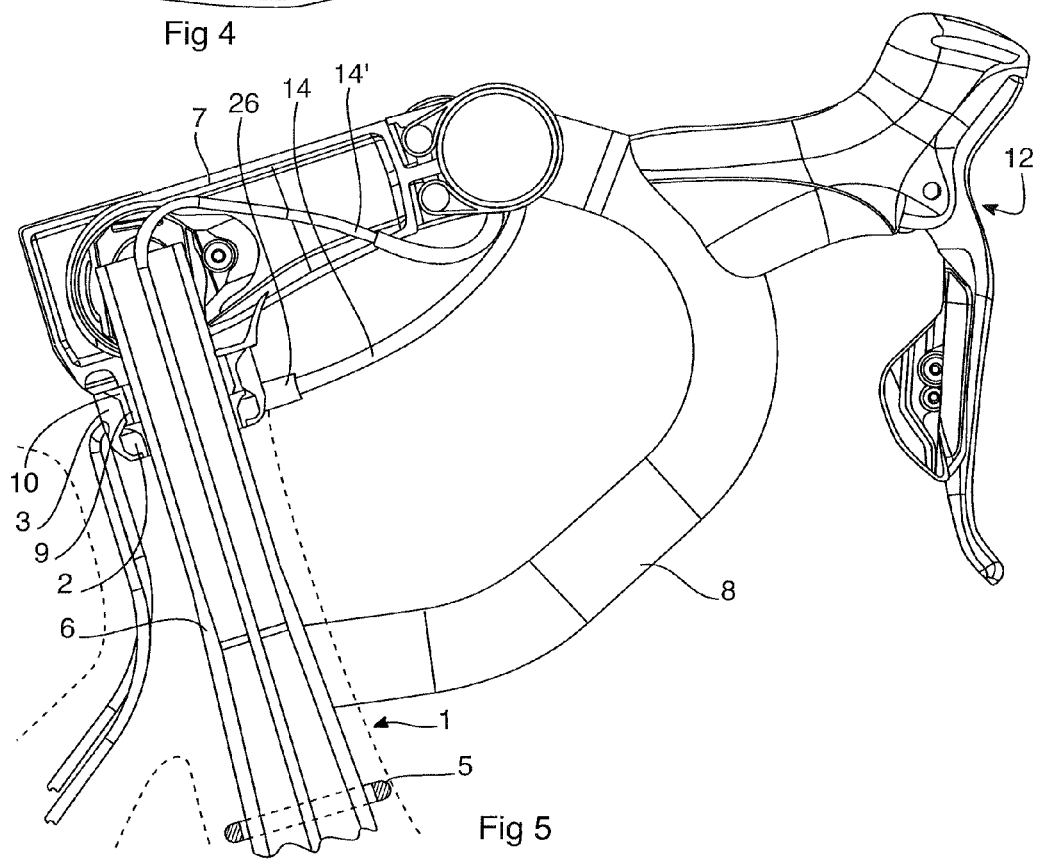

GUIDE DEVICE FOR A FLEXIBLE LINKING MEMBER PASSING INTO A BICYCLE FRAME

BACKGROUND OF THE INVENTION

1. Field of the Invention

The present invention relates to a guide device for a flexible linking member passing into a bicycle frame to link a control member carried by bicycle handlebars to a receiver.

2. Description of the Related Art

The bicycle derailleur gears and brakes are generally controlled by the cyclist using control members carried on the bicycle handlebars. To actuate the brakes or derailleurs respectively, the control members are linked thereto by a flexible linking member that conventionally comprises a cable fixed to the frame of the bicycle. In this case, the control means are entirely mechanical. Battery-powered electromechanical control means are also available nowadays, in particular for controlling a bicycle derailleur gear, and in this case the control members are linked to an electrical receiver via linking means in the form of electrical wires.

Hydraulic control means are also available, in particular for controlling a hydraulic brake, and in this case the control means are linked to a hydraulic receiver via linking means in the form of Durit© pipes, generally made of rubber reinforced with textile or metal layers.

All of these control means require the use of linking members in the form of cables, electrical wires or pipes.

Instead of attaching these linking members conventionally to the external faces of the bicycle frame, bicycle manufacturers nowadays often choose to pass these linking members through the inside of the different tubes that make up the bicycle frame, whenever possible. This results in a final product that is more aerodynamic and more aesthetic, and in which the linking members are well protected.

However, there is nonetheless a critical zone which is the front of the bicycle because practically all of the linking members coming from control members carried on the handlebars enter the front portion of the frame in order to pass through certain tubular elements of same. In this regard, the linking member that links the control member of the front brake to the front brake runs, in the case of a brake built into the fork, advantageously into the bicycle stem and then into the fork steerer before reaching the brake.

The other linking members coming from the handlebars enter the frame further away through a respective opening, often a lateral opening, provided near to the front end, either of the horizontal tube of the frame, or of the diagonal tube of the frame, depending on the location of the member to be controlled.

In general, a head tube forming part of the bicycle frame, and the fork steerer tube installed therein do not leave much room for the linking members to pass through. In this regard, it should be noted that electrical wires are easy to integrate as they are very flexible and of limited diameter, unlike cables and pipes, which cannot have very small radii of curvature. The concept of head tube should be understood in its broadest sense as a tubular element able to receive a headset and through which a fork steerer can be passed.

Document DE 20 2013 005 555 U1 describes a guide device for a flexible linking member passing through a tube of a bicycle frame, in particular a head tube. This device includes an insert in the form of a plate built onto one side of the head tube. This insert is seated in a cut-out substantially halfway up the head tube. The insert is secured in the cut-out using a screw and it has several channels to enable functional elements such as Bowden cables to pass through. The channels open outwards on inlet openings for the functional elements.

One drawback of this device is that it requires a head tube with a relatively large width to provide sufficient space to incorporate this device, which is wide. For this reason, this device cannot be positioned at the top close to an upper bearing of the headset arranged in the head tube, whereas it would be preferable to be able to insert the linking members into the frame as high up as possible to minimise the length of the linking members outside the bicycle frame, between the control members and the inlet openings in the frame.

SUMMARY OF THE INVENTION

The purpose of the invention is to propose a guide device for a flexible linking member passing into a bicycle frame that can overcome the drawbacks of known devices. The guide device according to the invention makes it possible to hide within the frame a maximum length of the linking members for improved aerodynamics and improved integration, and to narrow the portion of the head tube between the upper bearing and the lower bearing of the headset, thereby reducing the frontal surface area of the bicycle. In other words, the guide device according to the invention enables the internal walls of the headset to be, within a central zone of same, very close to the fork steerer tube.

The invention relates to a guide device for a flexible linking member passing into a bicycle frame to link a control member carried on bicycle handlebars to a receiver, said linking member entering the bicycle frame through an inlet opening formed in a head tube, the guide device forming an insert that can be built into the head tube and that includes at least one guide channel for said linking member that is designed to communicate with said inlet opening, characterized in that said insert can be placed inside the head tube in a seat shared with an upper bearing of a headset, said insert having a lower face that can at least partially surround a fork steerer inserted into the head tube, and an external face containing said guide channel.

According to other features of the invention:
said insert has an overall semi-circular shape;
said insert forms a closed circle;
said insert includes, on the periphery thereof, means for preventing rotation in relation to the head tube;
said rotation prevention means include at least one non-circular formation cooperating with a matching surface provided in said shared seat;
said insert is in two parts that together form said closed circle;
the two parts of the insert extend downwards and have, in the lower portion of the lower face thereof, a recess forming a raceway for said upper bearing;
said insert is a single annular part forming said closed circle;
said insert is placed above said upper bearing on the outside of a threaded cover cooperating with a thread provided on the upper portion of a fork steerer inserted in the head tube;
said insert is placed beneath said upper bearing;
said inlet opening is formed in a forward-facing projection at the upper end of the head tube; and
several guide channels parallel to one another are provided on said external face of the insert, and a corresponding number of inlet openings are provided on the upper portion of the head tube, next to a respective guide channel when said insert is in said shared seat.

BRIEF DESCRIPTION OF THE DRAWINGS

Other features and advantages of the invention are set out in the following description of a non-limiting embodiment of the invention, provided with reference to the attached drawings in which:

FIG. 3 is an exploded perspective view showing the guide members of a guide device in two parts according to the invention;

FIG. 4 is a perspective view showing a variant of a guide member;

FIG. 5 is a schematic cross-sectional side view of a head tube fitted with a guide device according to the invention;

DETAILED DESCRIPTION OF THE PREFERRED EMBODIMENT

Figure 1:
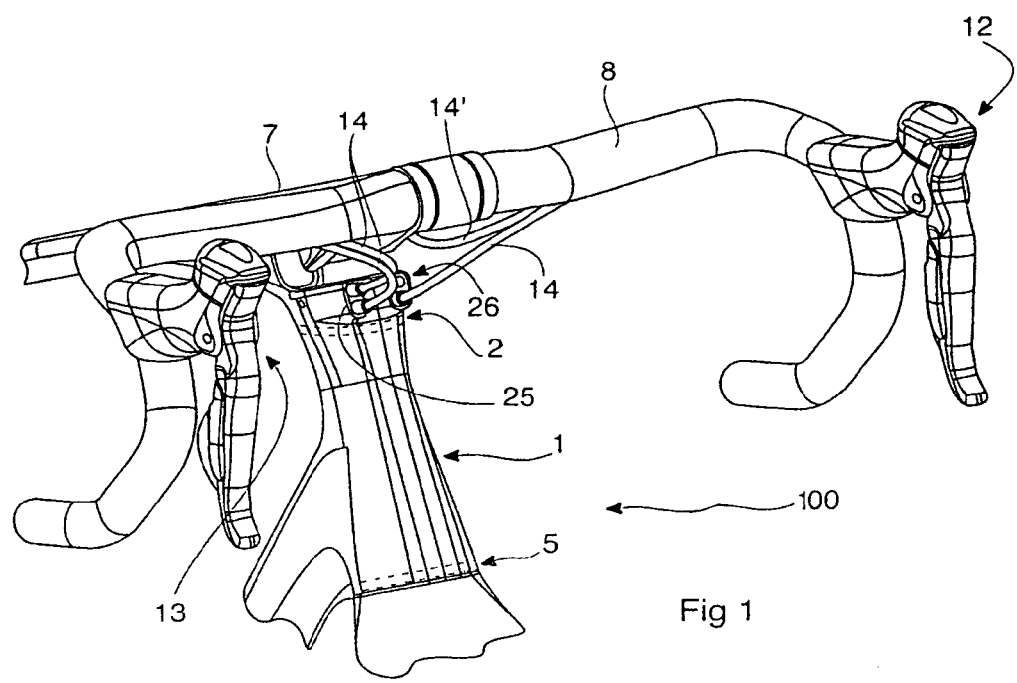
FIG. 1 is a schematic perspective view showing the upper front portion of a bicycle in which the head tube is provided with a guide device according to the invention.
Figure 2:
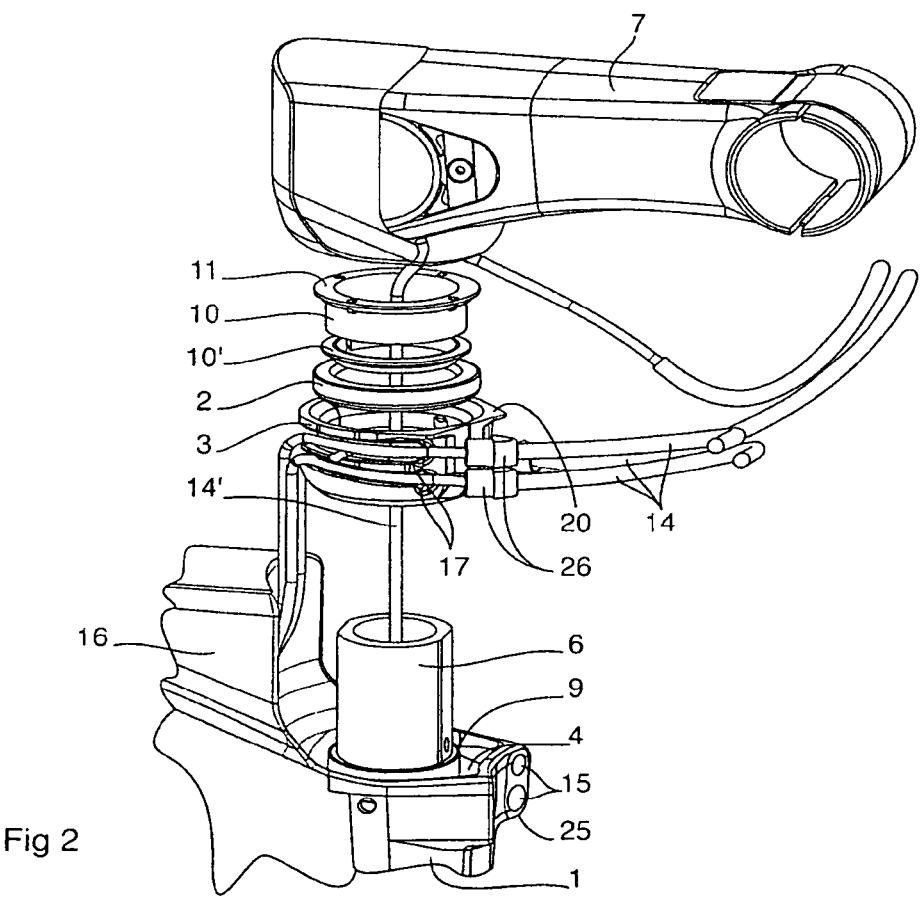
FIG. 2 is an exploded perspective view showing the upper portion of a head tube and an upper bearing related to a guide device according to the invention.

Identical or equivalent elements in the figures have the same reference signs. FIG. 2 is an exploded view showing the upper portion of a head tube 1 and an upper bearing 2 related to a guide device 3 according to the invention. The upper bearing 2 is part of a headset and must be placed in a seat 4 provided at the upper end of the head tube 1. A lower bearing 5 (shown schematically in FIG. 5) is received in a similar seat at the lower end of the head tube 1. For more details on the subject of the headset, reference is made to application FR 2 954 266 from the applicant.

A fork steerer tube 6 passes through the head tube 1 and protrudes upwards to be linked to the back end of a stem 7, which carries handlebars 8 at the front end of same.

The top portion of the fork steerer tube 6 has a threaded collar 9 which may be a bushing attached to the fork steerer tube. The threaded collar is intended to cooperate with a threaded cover 10 having a flange 11 such as to achieve an axial tightening, flattening the bearings 2 and 5 against the respective seat 4 thereof. A conical compression ring 10' is inserted between the upper bearing 2 and the flange 11 of the threaded cover 10 to cooperate with a corresponding surface of the bearing 2.

The handlebars 8 carry control members 12, 13 enabling the cyclist to control the front and rear brakes (not shown) and advantageously also the derailleur gear (not shown). The control members 12, 13 are linked to the devices to be controlled via flexible linking means 14 in the form of cables, electrical wires or pipes as a function of the control method, as explained above.

One of these linking members 14' (see FIG. 5) leaves the handlebars before, in a known manner, entering the stem 7 directly, before passing through the fork steerer tube 6 to control the front brake.

The other flexible linking members 14 enter the bicycle frame 100 through a respective opening 15 formed in the front face of the head tube 1.

The guide device according to the invention is used to guide one or more of the flexible linking members 14 into the head tube 1 before passing through the horizontal tube 16 or the diagonal tube (not shown) of same.

The guide device forms an insert 3 built into the head tube 1, includes at least one guide channel 17 (see FIG. 3) that is able to receive a flexible linking member 14, and communicates with the inlet opening 15.

According to the invention, the insert 3 can be placed inside the head tube 1 in the seat 4 that is a seat shared by the insert and the upper bearing 2 of the headset.

The insert 3 is semi-circular and an internal face 18 thereof can at least partially surround a fork steerer 6 inserted into the head tube 1, while an external face 19 thereof preferably has a groove forming the guide channel 17. However, this guide channel can also be closed to the outside by a thin skin, for example around 1 mm thick.

In the example shown in FIGS. 2 to 3 and 5 to 8, the insert 3 forms a closed circle in the form of a ring or cylinder. The insert 3 includes, on the periphery thereof, means for preventing rotation in relation to the head tube 1. These rotation prevention means preferably include at least one non-circular formation such as a flat portion 20 cooperating with a matching surface 21 provided in the shared seat 4.

Figures 6, 7:
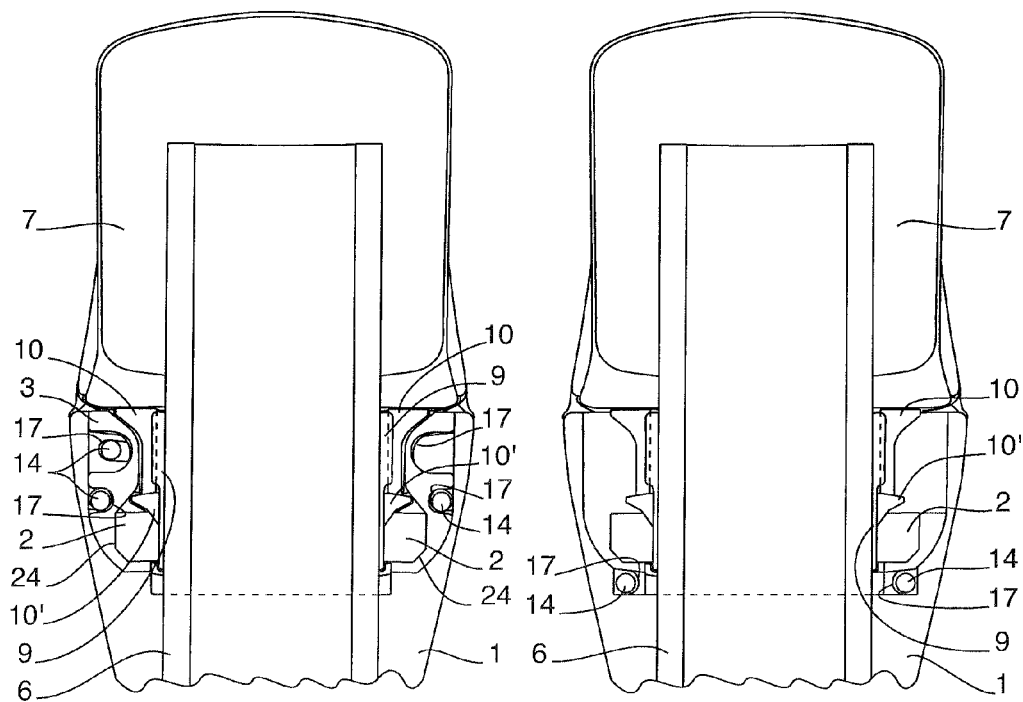
FIG. 6 is a schematic cross-sectional front view showing the guide device in FIGS. 2, 3 and 5 in which the lower portion of the guide member forms a raceway receiving an upper bearing of a headset.
FIG. 7 is a schematic cross-sectional front view showing a variant of the guide device according to the invention arranged beneath an upper bearing of a headset.
Figures 8, 9:
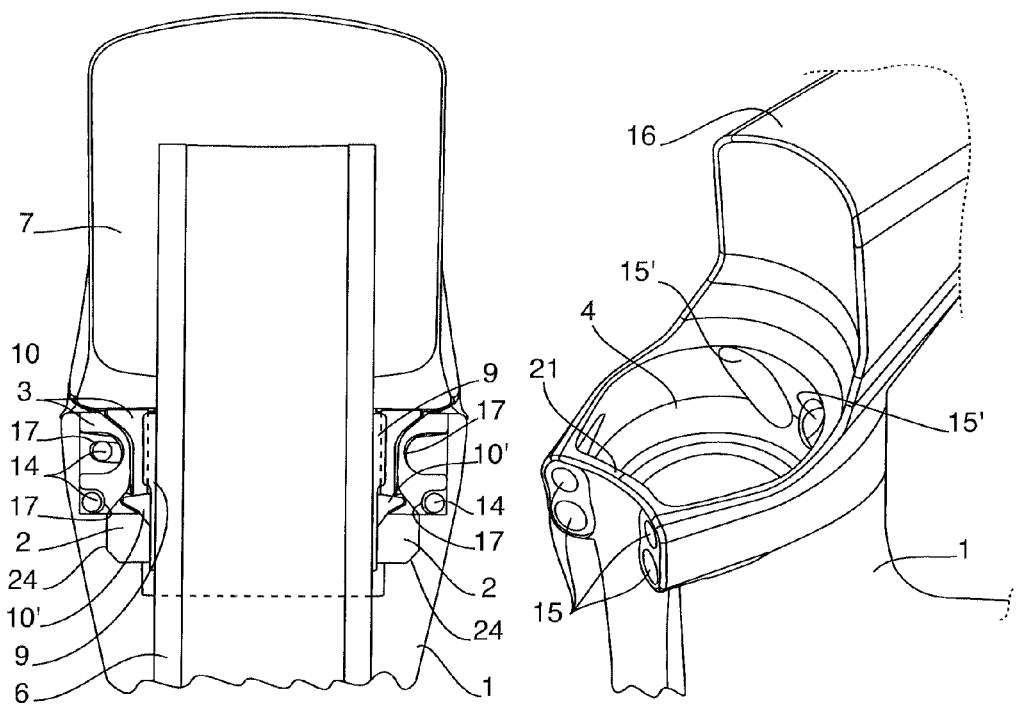
FIG. 8 is a schematic cross-sectional front view showing the guide member according to the invention arranged immediately above an upper bearing of a headset.
FIG. 9 is a partial perspective top view showing the shared seat of the upper bearing and of the guide device according to the invention.

In one embodiment, the insert 3 is a single annular part forming a closed circle. It can be placed above the bearing 2 extending around the threaded cover 10 and the compression ring 10', as shown in FIG. 8. It can also be placed beneath the bearing 2, as shown in FIG. 7.

FIGS. 2, 3, 5 and 6 show an advantageous embodiment in which the insert 3 is in two parts, specifically a first part 3A and a second part 3B (see in particular FIG. 3). The first and second parts 3A, 3B are semi-circular overall and the junction planes thereof are provided with pins 22 respectively for holes 23 receiving the pins 22 when the two parts are joined.

According to a feature of the invention, the two parts 3A, 3B of the insert 3 extend downwards and have, in the lower portion of the lower face thereof, a recess (see FIGS. 2, 5 and 6) forming a raceway for the upper bearing 2.

According to a feature of the invention, an inlet opening 15 is formed in a forward facing projection 25 at the upper end of the head tube 1, beside the guide channel 17 when the guide device 3 is in the seat 4.

FIG. 4 shows a guide device 3' according to the invention formed by a globally semi-circular element forming an insert having a single guide channel 17. This insert can be placed on a single side in the seat 4 or be doubled to form a closed circle with two opposing guide channels. Naturally, this insert may also be annular with two opposing channels.

FIGS. 2, 3, 5 to 6 and 8 show an advantageous embodiment of the insert 3 with several parallel guide channels 17, and a corresponding number of inlet openings 15 formed in the upper portion of the head tube 1 and arranged such as to communicate with a respective channel of the insert 3 when same is installed in the head tube.

In the seat 4, the outlet openings 15' for the flexible linking members 14 are formed substantially opposite the inlet openings 15.

Each flexible linking member 14 is advantageously provided with a sleeve 26 that is to be inserted in the inlet opening 15 to form a stop and to seal the opening.

This provides a guide device that is easy to incorporate into a head tube next to the upper bearing of a headset placed in the head tube. The invention enables the inlet openings of the flexible linking members extending from a control member carried on bicycle handlebars to be placed immediately beneath the bicycle stem, and the length of the linking members outside the bicycle frame is substantially reduced.

Another advantage of the invention is that the width of the portion of the head tube extending between the upper bearing and the lower bearing can be substantially reduced, which provides aerodynamic and aesthetic advantages. Naturally, the invention is not limited to the examples illustrated and described, but a great number of variants and combinations are conceivable within the scope of the invention.

The invention claimed is:

1. A guide device for a flexible linking member that passes into a bicycle frame (100) to link a control member carried on bicycle handlebars to a receiver, said linking member entering the bicycle frame (100) through an inlet opening formed in a head tube (1) of the bicycle frame (100), the guide device comprising:
    an insert configured to be built into the head tube,
    wherein said insert includes at least one guide channel for said linking member configured to communicate with said inlet opening,
    wherein said insert is configured to be placed inside the head tube in a seat shared with an upper bearing of a headset, and
    wherein said insert has an internal face that can at least partially surround a fork steerer inserted into the head tube, and an external face containing said guide channel.

2. The guide device according to claim 1, wherein said insert has an overall semi-circular shape.

3. The guide device according to claim 2, wherein said insert forms a closed circle.

4. The guide device according to claim 1, wherein said insert includes, on a periphery thereof, means for preventing rotation in relation to the head tube.

5. The guide device according to claim 4, wherein said rotation prevention means include at least one non-circular formation cooperating with a matching surface provided in said shared seat.

6. The guide device according to claim 1, wherein said insert is in two parts that together form said closed circle.

7. The guide device according to claim 6, wherein the two parts of the insert extend downwards and have, in the lower portion of the lower face thereof, a recess forming a raceway for said upper bearing.

8. The guide device according to claim 2, wherein said insert is a single annular part forming said closed circle.

9. The guide device according to claim 1, wherein said insert is placed above said upper bearing on the outside of a threaded cover cooperating with a thread provided on the upper portion of a fork steerer inserted in the head tube.

10. The guide device according to claim 8, wherein said insert is placed beneath said upper bearing.

11. The guide device according to claim 1, wherein said inlet opening is formed in a forward-facing projection at the upper end of the head tube.

12. The guide device according to claim 1, wherein several guide channels parallel to one another are provided on said external face of the insert, and a corresponding number of inlet openings are provided on the upper portion of the head tube, next to a respective guide channel when said insert is in said shared seat.

13. The guide device according to claim 2, wherein said insert includes, on a periphery thereof, means for preventing rotation in relation to the head tube.

14. The guide device according to claim 3, wherein said insert includes, on a periphery thereof, means for preventing rotation in relation to the head tube.

* * * * *